United States Patent
Mehta et al.

(10) Patent No.: US 7,926,042 B2
(45) Date of Patent: Apr. 12, 2011

(54) SYSTEM AND METHOD FOR DYNAMIC INSTRUMENTATION

(75) Inventors: Virendra Kumar Mehta, Santa Clara, CA (US); Sandya S. Mannarswamy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1563 days.

(21) Appl. No.: 11/264,651

(22) Filed: Oct. 31, 2005

(65) Prior Publication Data

US 2007/0168998 A1    Jul. 19, 2007

(51) Int. Cl.
*G06F 9/45* (2006.01)

(52) U.S. Cl. ........ 717/130; 717/139; 717/142; 717/148; 717/158

(58) Field of Classification Search .................. None
See application file for complete search history.

(56) References Cited

U.S. PATENT DOCUMENTS 7,146,607 B2 * 12/2006 Nair et al. ............. 717/151
7,475,394 B2 * 1/2009 Calder et al. .............. 717/158

* cited by examiner

*Primary Examiner* — Chuck O Kendall

(57) ABSTRACT

A system and method for dynamic instrumentation of an interpreted application. The method includes the operation of loading an interpreted code unit into a virtual machine. Testing instrumentation can then be inserted into the interpreted code unit using the virtual machine while the interpreted application continues executing. Another operation is executing the interpreted code unit with the testing instrumentation.

25 Claims, 3 Drawing Sheets

SYSTEM AND METHOD FOR DYNAMIC INSTRUMENTATION

BACKGROUND

In computer programming, an interpreted language is often defined as a programming language whose programs may be executed from source or an intermediate form by an interpreter. Any language may be compiled or interpreted, so this designation refers to a language's implementation rather than syntax. Some languages have both compilers and interpreters, including Lisp, BASIC, and Python. In the past, interpreted languages were compiled line-by-line. In other words, each line was compiled as it was about to be executed, but this has become less common. Most interpreted languages use an intermediate representation, which combines both compilation and interpretation. In this case, a source compiler may output some form of intermediate code representing the executable code for a virtual machine, which is then executed by an interpreter or a software virtual machine. Examples of current common interpreted languages include Java, Visual Basic, Perl, etc.

Java is one of the more popular interpreted programming languages currently being used. A Java software program is usually compiled into an intermediate representation called bytecodes which are then put in 'class' files. A software virtual machine called a Java Virtual Machine (JVM) is provided for most platforms and that makes Java programs platform independent and even more popular. As a result, there is a demand for quality Java software and various tools exist to aid programmers in reducing the number of bugs found in released software. Java applications are used to deploy a large number of mission-critical applications on centralized servers, especially in multi-tier environments.

Reliable code coverage tools play a strong role in assessing the quality and performance of software applications and are often credited with reducing the number of bugs found in software released from a software development organization. However, code coverage tools for interpreted languages are few and far between even though the dynamic run-time aspects of interpreted languages provide some interesting opportunities that static compilation environments do not provide.

One of the problems with developing large complex programs in an interpreted language (such as Java) is that most of the time the software developers rely on black-box testing of the integrated application in a mock environment. It is important to test every line of code before the application is deployed in a mission-critical environment. As a result, this line testing is usually achieved through instrumentation logging that is added by the programmers. However, it is not practical to log all code sequences and there are certain code segments or pieces which may not get tested. This can be a problem in long-running mission-critical applications where a glitch can bring down the entire software system. Good code coverage tools are needed are valuable in testing the code of an interpreted application before the application is deployed.

There is another reason more effective code instrumentation tools are needed for interpreted languages. Interpreted languages are sometimes developed to enable a "write-once run-anywhere" strategy, which provides a software vendor's customers with a wide variety of choices for deployment platforms. Good code coverage tools that are available for multiple environments provide platforms which have higher performance and good deployment tools to enable the customers' mission critical needs. Coverage tools are more valuable when the tools are more comprehensive.

Instrumentation solutions have generally used programmers to add kludgy instrumentation using print statements to measure coverage or tools which work on the class files by instrumenting the source code to generate data before the source code is compiled. This method is inspired by the C/C++ style static programming world. Such instrumentation can drastically reduce the performance of an executing program and thereby change the application profile in multi-tier distributed systems.

DETAILED DESCRIPTION

Figure 1:
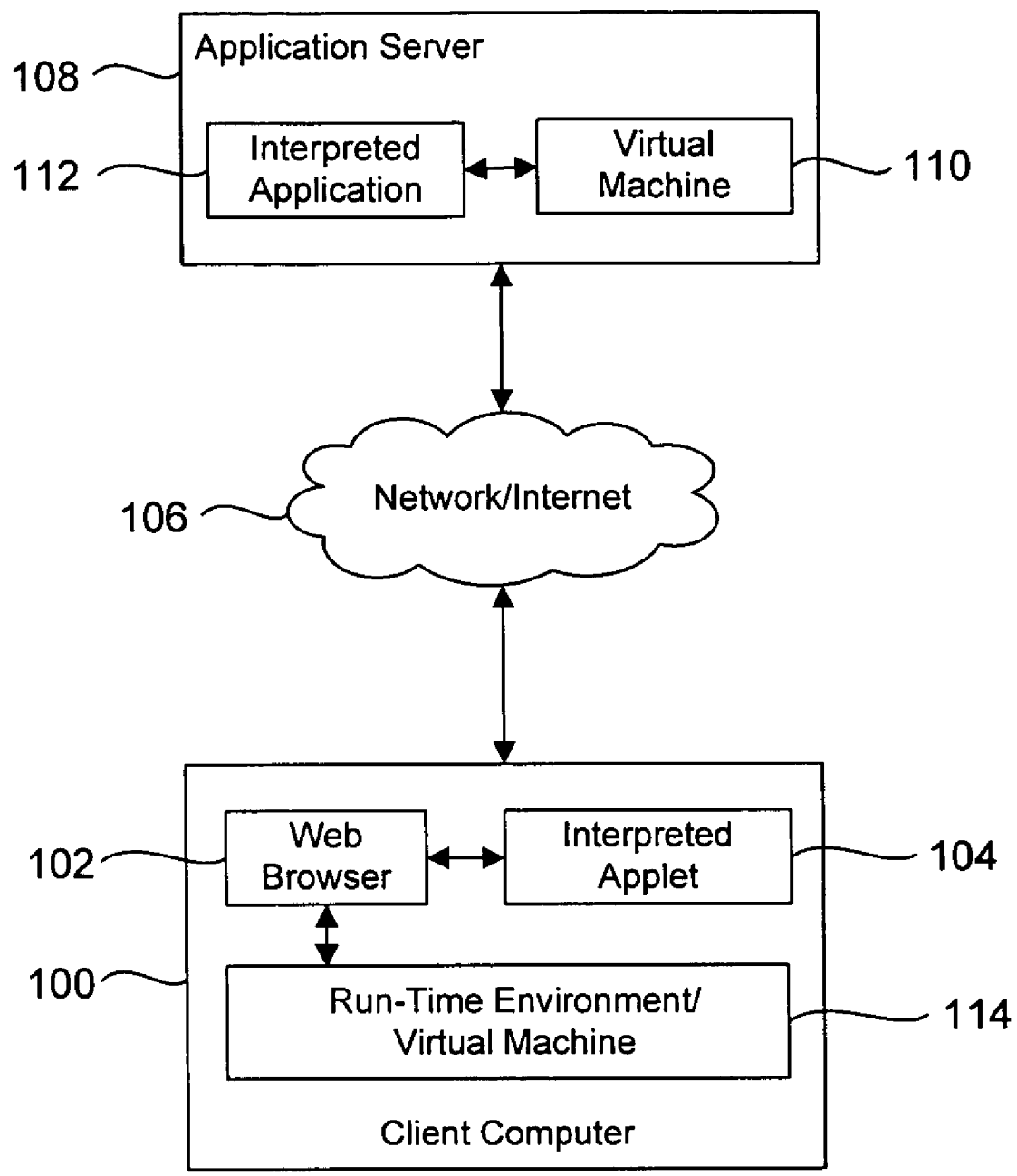
FIG. 1 illustrates environments where the dynamic instrumentation of interpreted applications is performed in accordance with an embodiment.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method is provided that uses a virtual machine for interpreted languages to provide selective instrumentation and code coverage analysis. This instrumentation can be turned on and off using commands to the virtual machine without resorting to intrusive class file modification. The instrumentation modules can integrate with other analysis tools provided in the interpreted language environment. Examples of interpreted languages that can use the system and method of the present invention can include the Java environment, Visual Basic environment and other interpreted program execution environments. Generating instrumentation at the virtual machine level helps supply a more comprehensive tool suite which can be used in the production environment for applications that have been developed and compiled for use with a virtual machine.

FIG. 1 illustrates environments within which the presently described embodiments may operate. An interpreted application 112, such as a Java application, can be executing on an application server 108. While Java will be used as an example of the present system and method in this description, any interpreted application type may be used with the present embodiments. In particular, the described embodiments are valuable for hybrid compiled/interpreted language environments.

The interpreted application 112 may be a mission critical application that is running constantly without any downtime. For example, the interpreted application can be a web application for a high traffic retail web site. This means that stopping the entire application for instrumentation and debugging may not be a realistic option. Because the production application may be heavily used, instrumentation for the entire application or instrumentation of parts of the application for a significant period of time may not be feasible.

A virtual machine 110 may be running on the application server 108, and the interpreted application or application modules may be executing through the virtual machine. This configuration is particularly useful for threaded applications, and the virtual machine can have an execution queue where threads of the interpreted application are loaded. The interpreted application or Java application may be compiled to an intermediate byte-code representation that is stored on the application server. Then the intermediate byte-code representation can be interpreted by the virtual machine for execution on the application server 108.

The output of the interpreted application for a user can be provided through an electronic network or the Internet 106 to a client computer 100. The user input for the interpreted application may have been provided through a client program (not shown) that is an independent executable application at a remote or local location. Alternatively, the user input may be provided by a web client interface. Many different types of clients can be used to access the interpreted application through the network or application server.

An interpreted application that executes through a web browser may be used with the present embodiments. This type of application is often called an applet 104. This web browser dependent application will use the run-time environment and virtual machine 114 that is loaded on the client computer.

Code coverage testing of software products has generally been difficult in multi-threaded environments. This is especially true for applications written in Java and similarly implemented languages which make it much easier to implement thread based development. Code coverage tools generally instrument code when it is compiled, but this instrumentation causes a slowdown in application performance. Even if fine grained coverage is used (e.g., with a static code modifier), the instrumentation will slow down the execution of a method or class in every invocation.

The present system and method selectively instruments a code unit, and then in the same run, the system enables the application to resume execution at a faster speed. This improved performance can be valuable in situations where timing windows are drastically affected in one part of the program and not in others. A software developer may want the critical regions to execute at the optimal performance, while code coverage analysis goes on in other sections. The dynamic instrumentation of code and the removal of instrumentation are quite useful in this situation.

Figure 2:
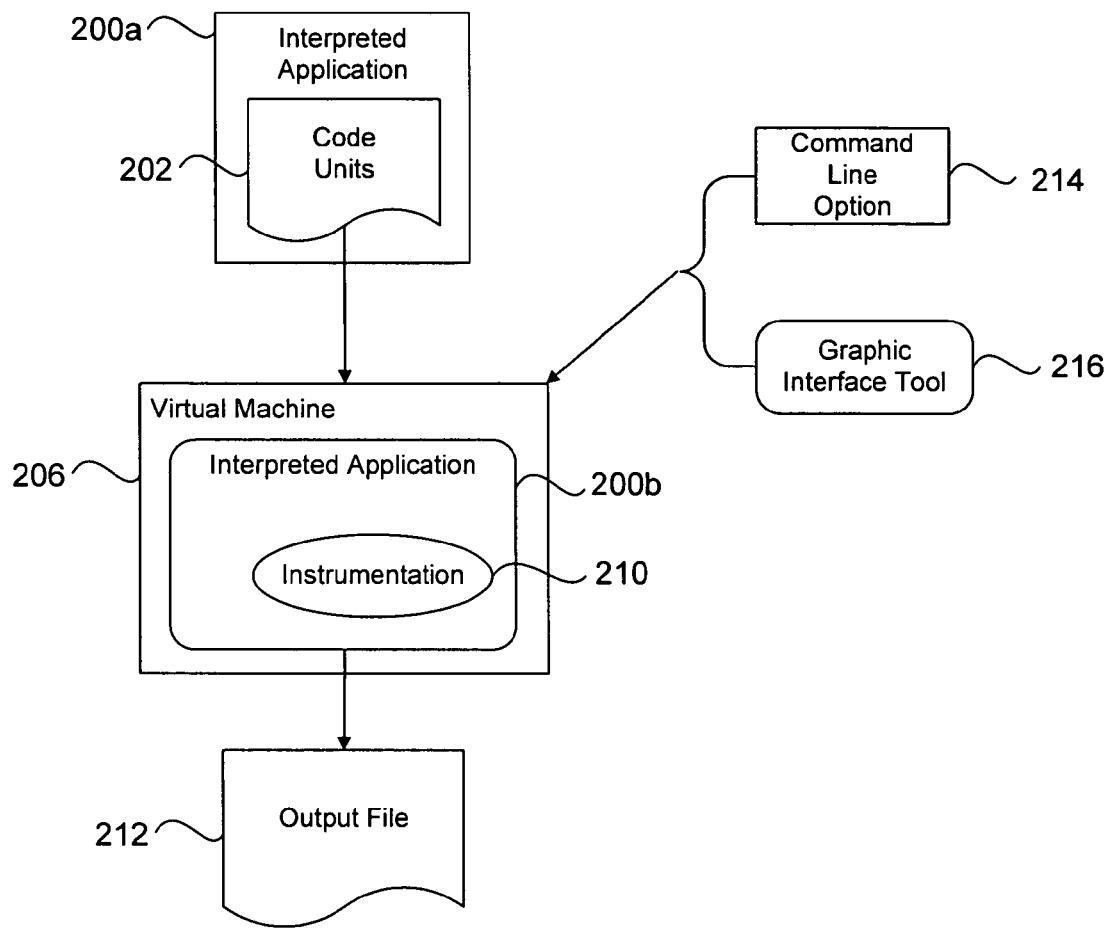
FIG. 2 illustrates an embodiment of a virtual machine and its related input and output files.

FIG. 2 illustrates a system for dynamic instrumentation of interpreted software code. The system includes an interpreted application 200a having a plurality of code units 202. These code units may be separate methods, functions, units, or object classes within a program.

A virtual machine 206 may be included and configured to decompile and recompile a selected interpreted code module while the interpreted application 200b executes. The code module can be decompiled to allow instrumentation code 210 to be inserted or added into the interpreted code unit by the virtual machine. Then the selected interpreted code module is recompiled with the instrumentation. This means that the virtual machine is modified to dynamically decompile a method, class or code unit and recompile the code unit with instrumentation on command. These virtual machine changes may be made by a vendor who is developing and maintaining both a virtual machine and debugging tools.

The instrumentation 210 may provide application coverage information, branch coverage information or specific messaging as defined by a programmer. In addition, the instrumentation may generate output that is written to an output file stored on disk or another storage device. The output file can be accessed by an instrumentation analysis tool such as a code coverage tool or branch coverage tool. In some cases, the output file may be plain text that is readable by a software developer.

Enabling the virtual machine to instrument code while the application is currently executing on the virtual machine helps to provide a low-overhead solution for generating code coverage and other instrumentation information. The runtime component of a virtual machine contains a significant amount of information about the executing program. For example, a large amount of information can be provided by the Java virtual machine known as Hotspot (developed by Sun), which has an interpreter phase followed by a dynamic-compiler phase. In this example case, the interpreter profiles the application dynamically with every run to help generate efficient native code for selected methods. Including instrumentation ability in the Java virtual machine provides additional information for tools like metering and tuning tools which provide performance analysis to software developers or product users. The code coverage information that is generated and stored in a file can be analyzed by an off-line or on-line tool.

The virtual machine may include a signal handler in the virtual machine. The signal handler can be configured to receive commands to identify an interpreted code unit to be decompiled by the virtual machine. The signal handler can trap a signal and connect to the process sending the signal to pass the data. Then the interpreted code unit can be recompiled with instrumentation and put in an execution queue. When the virtual machine receives a signal with information to stop applying code coverage, the virtual machine decompiles the method again, loads the stored method code from the disk, and puts the compiled method code back into the queue.

FIG. 2 further illustrates that a command line option 214 can be used to submit the name of the code unit or module that is to be instrumented. In another embodiment, a graphic interface tool 216 or virtual machine client can be used to instruct the virtual machine to instrument a particular code module. In addition, the graphic interface tool or command line interface can be used to turn instrumentation on or off.

Feedback from the virtual machine can also be received by the graphic interface tool. A graphical portion of the interface tool or a separate graphical tool may be used to display code coverage for the interpretable computer code as captured by the virtual machine. Branch coverage may also be displayed using the same tools. More specifically, the virtual machine may store one or more bit vector data structures representing line coverage or branch coverage of an interpreted code unit. This vector coverage may then be output in a graphical format for a software developer.

A coverage report or output file 212 can also be output in an XML format, text format or another useful output file format. For example, the virtual machine output can include information such as the line coverage, branch coverage, method coverage, class coverage, and package coverage. The present embodiments provide tools which can read the instrumentation output information off-line or the tool can attach itself to the virtual machine and display the information on-line for the duration of the attachment.

The benefits of applying code coverage through a virtual machine that instrument an interpreted application while the application is executing are several-fold. Execution time instrumentation does not require the entire program to be recompiled in order to apply instrumentation nor do the class files need to be re-created. Recompilation or regeneration of the interpreted application can involve a large amount of work in multi-tier systems where the software system deployment is often quite complex.

Another benefit is that the run-time system or virtual machine is in the complete control of the instrumentation at execution time, and software developers or users can selectively turn the instrumentation (or coverage) on or off as desired. Applying instrumentation through the virtual machine provides on-demand coverage analysis in production environments which is a valuable aid in debugging and optimizing applications. In addition, the present invention allows software developers to get snapshot coverage information for certain portions of executing applications. The concepts described in the description may also be used for other dynamic systems providing a significant run-time environment.

The present embodiments are also beneficial because providing code coverage analysis through instrumenting the entire application can reduce the application performance drastically. Code coverage is often considered a unit test level analysis. However, code coverage testing has its role in production systems where software developers can track a bug or performance degradation for specific pieces of code by knowing what portions of the code were executed in a specific run. This is even more important in virtual and dynamic environments where classes and methods get loaded and unloaded all the time.

The present embodiments leverage the virtual machine to provide selective code coverage which can be turned on and off with user input without resorting to extensive class file modifications. In this environment, if the software developer can selectively and dynamically turn code coverage on and off, that can provide better insight into the running application. In contrast, if the entire application is instrumented, the application profile in multi-tier distributed systems changes dramatically and makes instrumentation in a production environment unfeasible. The present embodiments can also integrate with other analysis tools provided in the interpreted application environment ecosystem.

Figure 3:
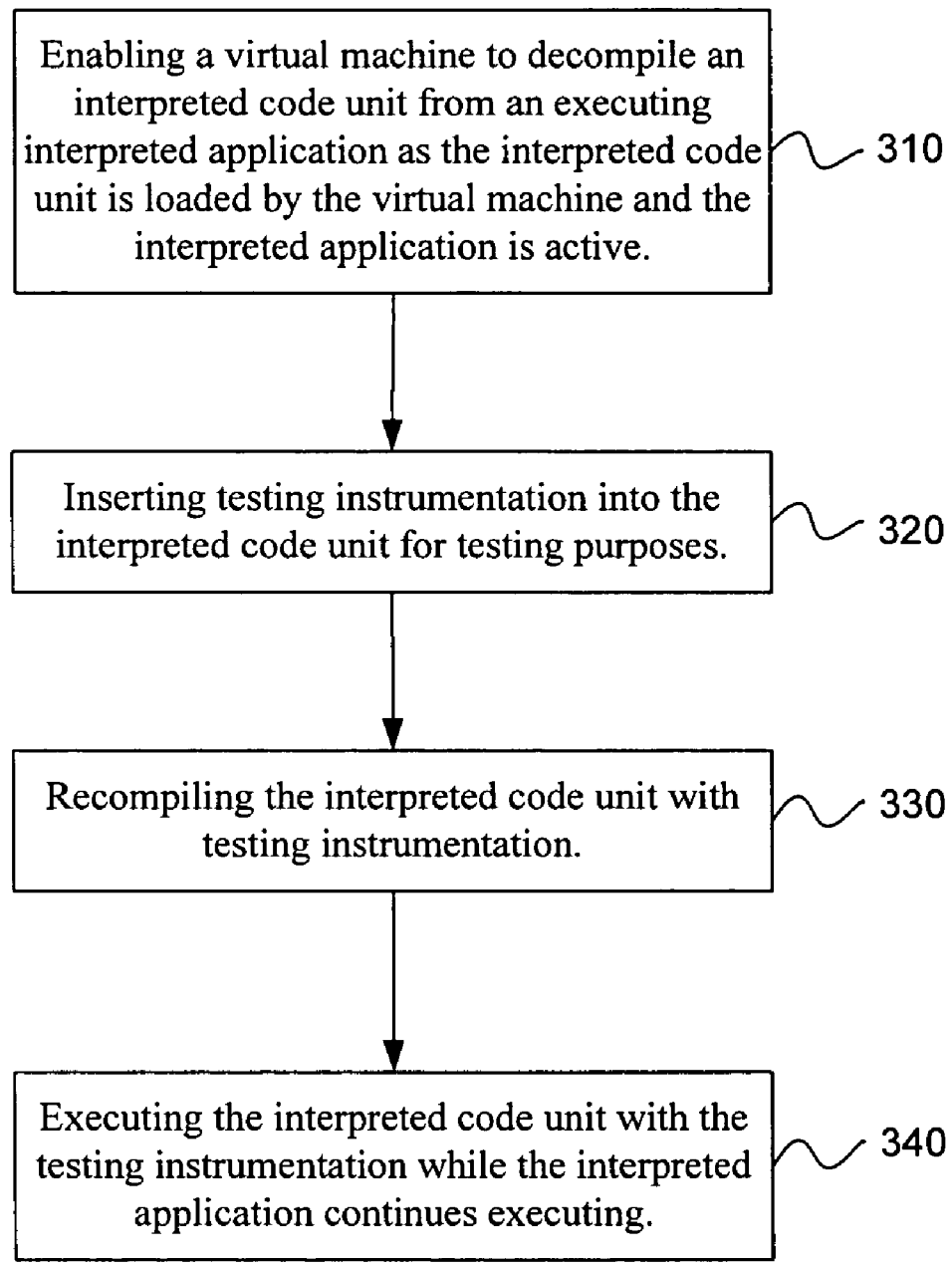
FIG. 3 is a flowchart illustrating operations performed in dynamic instrumentation of an interpreted application.

FIG. 3 illustrates a method for dynamic instrumentation of interpreted software code. The method can include the operation of enabling a virtual machine to decompile an interpreted code unit from an executing interpreted application as the interpreted code unit is loaded by the virtual machine, as in block 310. The code unit may be a method, class, or module.

Another operation is inserting testing instrumentation into the interpreted code unit for testing purposes, as in block 320. The instrumentation can be selected for an entire code unit or for a portion of the unit. For example, the virtual machine may receive commands through a user interface to instrument only certain lines of the interpreted code unit. This functionality for the instrumentation can be activated using a command line option for the virtual machine or through a graphical user interface that communicates with the virtual machine.

An input properties file can be supplied to the virtual machine though the command line or graphical interface. This input properties file is much like a script or detailed road map of where the instrumentation will take place in the interpreted application. The input properties file can include a list of packages, classes or method for which instrumentation is desired to be generated through the virtual machine.

Once the instrumentation has been added, then the interpreted code unit can be recompiled with the testing instrumentation incorporated into the code, as in block 330. Next, the interpreted code unit can be executed with the testing instrumentation while the interpreted application continues executing, as in block 340. While the instrumented code is executing, the virtual machine can generate an output file with information comprising line coverage, branch coverage, method coverage, class coverage, and package coverage. This output file may be in the XML format.

In one embodiment, the virtual machine can determine when the interpreted code unit has reached a defined threshold of coverage. For example, this threshold of coverage may be 95% or 100% of the code coverage. Once the defined threshold has been reached, then a message may then be sent back to a software developer telling the developer that the threshold has been reached. Providing an automated threshold level is valuable because a software developer is then able to test the application until a defined coverage threshold level is reached.

In another embodiment, the virtual machine may keep track of coverage and when the code under measurement reaches a certain level of coverage (e.g., 99%), the virtual machine can swap the originally compiled code into the virtual machine or remove the instrumentation from the code. In this case, the virtual machine can decompile and then recompile without instrumentation either at a certain level or defined amount of code coverage or on receiving a signal to do so.

The embodiments described herein provide dynamic code coverage facilities which have not been available before. In the past, a software development group could either implement instrumentation using hand-coded instrumentation which could turn itself off through a Boolean variable once the code was seen or through the static instrumentation of class files. Both these options degrade the application performance for the entire application run. With dynamic instrumentation, the performance penalty is temporary and may be localized while the test coverage is analyzed. As a result, the remainder of the execution run can avoid performance degradation. This help test and debug applications like large websites which stay up for a very long period of time and are performance critical.

An example of the present invention in the Java environment will now be described. A Java virtual machine can receive a class file of Java byte-codes as input for execution. The virtual machine may gather the desired coverage information if prompted through the command line option or other graphical interface.

In one case, the virtual machine may generate the instrumentation information for all the methods. In another case, an input properties file can provide a limited list of packages, classes, or methods for which to generate instrumentation. Alternatively, a list may be provided of code portions that the software developer does not want to instrument. Packages and classes in system files like rt.jar are not generally included unless explicitly stated in the properties file.

This allows the software developers to concentrate on the user code by default.

The information provided by the instrumentation may include:

Line Coverage—which Java program lines were executed.
Branch Coverage—whether the branches were taken or not taken.
Method Coverage—which methods were executed.
Class Coverage—which classes had some methods executed.
Package Coverage—which packages were touched during execution.

In addition, the virtual machine can provide selective code coverage of code blocks as desired. The Java virtual machine can be configured to either stop gathering information once a line is covered or to create a count of the number of times a component is covered, if desired.

This embodiment may provide coverage of J2EE applications because Servlets and Enterprise Java Beans along with other components are primarily written in Java. The instrumentation may maintain a sparse representation of the coverage information efficiently, by having a bit vector, one bit per line of the Java method, as part of the data structure maintaining the method information in a Java virtual machine. This bit vector is updated accordingly when a particular line in the method gets executed. A similar bit-vector scheme can be used on a per method basis to gather branch coverage information.

An example embodiment of a graphically based analysis tool will now be provided. The analysis tool reads the information generated by the Java virtual machine and helps assess the coverage of Java code during the run. The analysis tool can be executed in an off-line mode by reading the information from a generated file, or the analysis tool can attach itself to the Java virtual machine dynamically and provide on-line coverage information. In the latter mode, the analysis tool can switch itself on and off and the performance only degrades for the measurement period. The degradation in this situation may only be minimal because most of the information is already getting generated by the run-time environment.

The analysis tool may read coverage information statically or dynamically, and provides a comprehensive report describing which parts of the code were not tested or executed. In addition, the Java virtual machine can be asked to provide the number of times various components were executed and this information can be used to analyze whether the software developers are over-testing some areas. Instrumentation can also complement performance analyses. The analysis tool may also collect information generated from multiple sessions to provide comprehensive information from a set of execution runs which is helpful when running a test suite with differing inputs.

The analysis tool can generate reports to be analyzed later in HTML or XML formats, or the tool can be used in real-time with a GUI. These multiple modes improve the tool's utility because the analysis tool can be used as a batch program at the end of a nightly test run, or the analysis tool can be used to see the real-time effects of the execution in a user-friendly interface. Other output formats can be added for reports. In addition, the coverage information can be included alongside run-time profiling and memory profiling information. The analysis tool can become part of a suite of Java tools which helps improve the deployment of mission-critical Java and J2EE applications.

A summary of the present embodiments will now be provided. While the present system and method is illustrated through Java, the present embodiments can work for all systems that have a run-time component that can generate code or instrument the generated code. A mechanism may be provided by which the virtual machine is instructed to instrument the code itself as the virtual machine executes the class file bytecodes. The instructions to the virtual machine can be provided via online input or through a command line. The virtual machine may instrument the bytecodes directly as it reads them in. The virtual machine may also modify a copy of the bytecodes and insert the instrumented copy of the code only for a brief period or until the desired coverage information is collected, while letting the rest of the program run go without the performance implications. Instrumentation can take place for the virtual machine's internal representation of the bytecodes or even the compiled native code, which gives more flexibility and helps improve control of the application performance. The virtual machine also has access to execution thresholds for the methods and individual statements which may be used to decide when to convert the interpreted bytecodes to native compiled code. These program hooks can be used to set a range for any code coverage as well. For instance, the user may specify that as soon as all statements are touched once, the code coverage can be turned off, or the coverage can turn off after a method is executed for a given number of times. The latter would be useful, for example, if the execution profile stays constant and most of the profile information about various statements can be gathered from a few executions.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A method for dynamic instrumentation of an interpreted application, comprising the steps of:
    loading an interpreted code unit into a virtual machine;
    inserting testing instrumentation into the interpreted code unit using the virtual machine while the interpreted application continues executing;
    executing the interpreted code unit with the testing instrumentation; and
    determining when the interpreted code unit has reached defined coverage level and de-instrumenting the interpreted code after the defined coverage level has been reached.

2. A method as in claim 1, further comprising the step of removing the testing instrumentation from the interpreted code unit upon receiving removal instructions.

3. A method for dynamic instrumentation of an interpreted application, comprising the steps of:
    enabling a virtual machine to decompile an interpreted code unit from an executing interpreted application as the interpreted code unit is loaded by the virtual machine;
    inserting testing instrumentation into the interpreted code unit for testing purposes;
    recompiling the interpreted code unit with the testing instrumentation while the interpreted application continues executing; and
    determining when the interpreted code unit has reached defined coverage level and de-instrumenting the interpreted code after the defined coverage level has been reached.

4. A method as in claim 3, further comprising the step of decompiling and recompiling the interpreted code unit that is either a method or class.

5. A method as in claim 3, further comprising the step of executing an interpreted application on the virtual machine, wherein the interpreted application includes a plurality of interpreted code units.

6. A method as in claim 3, further comprising the step of activating instrumentation in a selected part of the interpreted code unit as instructed through a user interface.

7. A method as in claim 3, further comprising the step activating the instrumentation using a command line option.

8. A method as in claim 3, further comprising the step activating the instrumentation using a graphical user interface.

9. A method as in claim 3, further comprising the step generating an output file that contains instrumentation information selected from the group consisting of line coverage, branch coverage, method coverage, class coverage, and package coverage.

10. A method as in claim 9, further comprising the step of generating the output file in an XML format.

11. A method as in claim 3, further comprising the step of supplying an input properties file to the virtual machine, the input properties file having a list of packages, classes or method for which instrumentation is desired to be generated.

12. A method as in claim 3, further comprising the step of maintaining a bit vector data structure representing each line of interpreted code in an interpreted code unit.

13. A method as in claim 3, further comprising the step of maintaining a bit vector data structure representing branch coverage of an interpreted code unit.

14. A system for dynamic instrumentation of interpreted software code, comprising:
an interpreted application having a plurality of code modules;
a virtual machine that is configured to decompile and recompile a selected interpreted code module while the interpreted application executes; and
instrumentation code that is inserted into the interpreted code unit by the virtual machine before the selected interpreted code module is recompiled by the virtual machine;
wherein the virtual machine is further configured to determine when the interpreted code unit has reached defined coverage level and de-instrument the interpreted code after the defined coverage level has been reached.

15. A system as in claim 14, further comprising a signal handler for the virtual machine, the signal handler being configured to receive commands to identify an interpreted code unit to be decompiled by the virtual machine.

16. A system as in claim 14, further comprising a graphical tool to display code coverage for the interpretable computer code as captured by the virtual machine.

17. A system as in claim 14, further comprising a coverage interface to receive coverage information from the virtual machine.

18. A system as in claim 14, further comprising a coverage report output generated by the virtual machine in an XML file format.

19. A system as in claim 14, wherein the virtual machine output can include information selected from the group consisting of line coverage, branch coverage, method coverage, class coverage, and package coverage.

20. A system as in claim 14, further comprising a bit vector data structure representing each line of interpreted code in an interpreted code unit.

21. A system as in claim 14, further comprising a bit vector data structure representing branch coverage of an interpreted code unit.

22. An article of manufacture including a computer usable medium having computer readable program code embodied therein for dynamic instrumentation of interpreted software code, comprising computer readable program code capable of performing the operations of:
enabling a virtual machine to decompile an interpreted code unit from an executing interpreted application as the interpreted code unit is loaded by the virtual machine;
inserting testing instrumentation into the interpreted code unit for testing purposes;
recompiling the interpreted code unit with the testing instrumentation;
executing the interpreted code unit with the testing instrumentation while the interpreted application continues executing; and
removing the testing instrumentation from the interpreted code unit upon receiving removal instructions.

23. An article of manufacture as in claim 22, further comprising computer readable program code capable of performing the operations of decompiling and recompiling the interpreted code unit that is either a method or class.

24. A system for dynamic instrumentation of interpreted software code, comprising:
an interpreted application means having a plurality of code modules and configured for executing in an operating environment;
a virtual machine means for decompiling and recompiling a selected interpreted code module while the interpreted application executes;
instrumentation code insertion means for inserting instrumented code into the interpreted code unit via the virtual machine before the selected interpreted code module is recompiled; and
a signal handling means in the virtual machine means, the signal handler being configured for receiving commands for identifying an interpreted code unit to be decompiled by the virtual machine means;
wherein the virtual machine is further configured to determine when the interpreted code unit has reached defined coverage level and de-instrument the interpreted code after the defined coverage level has been reached.

25. A system as in claim 24, further comprising an interface means for displaying code coverage for the interpretable computer code as captured by the virtual machine means.

* * * * *